(12) United States Patent
Luick

(10) Patent No.: US 7,191,432 B2
(45) Date of Patent: Mar. 13, 2007

(54) HIGH FREQUENCY COMPOUND INSTRUCTION MECHANISM AND METHOD FOR A COMPARE OPERATION IN AN ARITHMETIC LOGIC UNIT

(75) Inventor: David Arnold Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 10/455,216

(22) Filed: Jun. 5, 2003

(65) Prior Publication Data

US 2004/0249878 A1 Dec. 9, 2004

(51) Int. Cl.
*G06F 9/45* (2006.01)
*G06F 9/44* (2006.01)

(52) U.S. Cl. ................. 717/136; 717/104; 708/236
(58) Field of Classification Search ........ 717/127–138, 717/104, 149; 712/216–219, 221–223; 708/236
See application file for complete search history.

(56) References Cited

U.S. PATENT DOCUMENTS

| | | | | |
|---|---|---|---|---|
| 5,450,555 A | * | 9/1995 | Brown et al. ............... | 712/228 |
| 5,734,879 A | * | 3/1998 | Gallup et al. ............... | 712/221 |
| 5,734,880 A | * | 3/1998 | Guttag et al. ............... | 712/221 |
| 5,867,712 A | * | 2/1999 | Shaw et al. ................. | 717/127 |
| 5,892,936 A | * | 4/1999 | Tran et al. .................. | 712/216 |
| 5,926,643 A | * | 7/1999 | Miura ........................... | 712/7 |
| 6,088,511 A | * | 7/2000 | Hardwick .................... | 717/149 |
| 6,240,508 B1 | * | 5/2001 | Brown et al. ............... | 712/219 |
| 6,366,998 B1 | * | 4/2002 | Mohamed ..................... | 712/17 |
| 6,609,189 B1 | * | 8/2003 | Kuszmaul et al. ........... | 712/23 |
| 6,880,150 B1 | * | 4/2005 | Takayama et al. .......... | 717/127 |
| 6,976,245 B2 | * | 12/2005 | Takayama et al. .......... | 717/127 |
| 7,028,107 B2 | * | 4/2006 | Vorbach et al. ............. | 710/10 |
| 7,047,394 B1 | * | 5/2006 | Van Dyke et al. .......... | 712/209 |

OTHER PUBLICATIONS

Parashar et al, "A complexity effective approach to ALU bandwidth enchancement for instruction level temporal redundancy", IEEE ISCA, vol. 32, isse 2, pp. 1-11, 2004.*
Rotenberg et al, "Traces Processors", IEEE, pp. 138-148, 1997.*
Ergin et al, "register Packing Exploring narrow width operands for reducing register file pressure", IEEE MICRO pp. 1-12, 2004.*
Sakai et al, "An architecture of a dataflow single chip processor", ACM pp. 46-53, 1989.*

* cited by examiner

*Primary Examiner*—Anil Khatri
(74) *Attorney, Agent, or Firm*—Martin & Associates; Derek K. Martin

(57) ABSTRACT

A high-frequency compound instruction mechanism and method allows performing a common compare immediate function before an add function has completed, thereby reducing the number of cycles to perform the add-compare function. By increasing the speed of performing the add-compare function, a branch mispredict signal may be provided to an instruction pipeline before data registers are affected by the pipelined instructions. The compound instruction mechanism of the preferred embodiments may be implemented within space that is primarily unused within arithmetic logic units, resulting in an implementation that only marginally increases space requirements on an integrated circuit.

23 Claims, 8 Drawing Sheets

FIG. 1
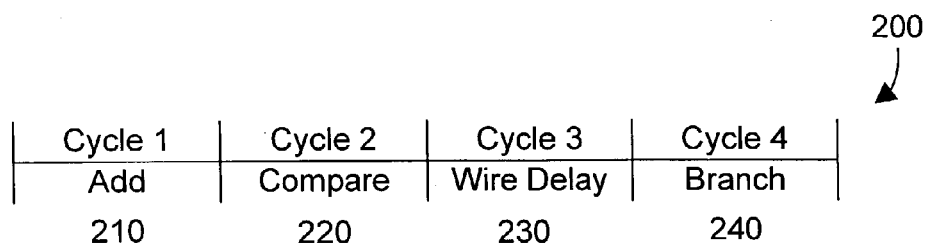
FIG. 2  Prior Art
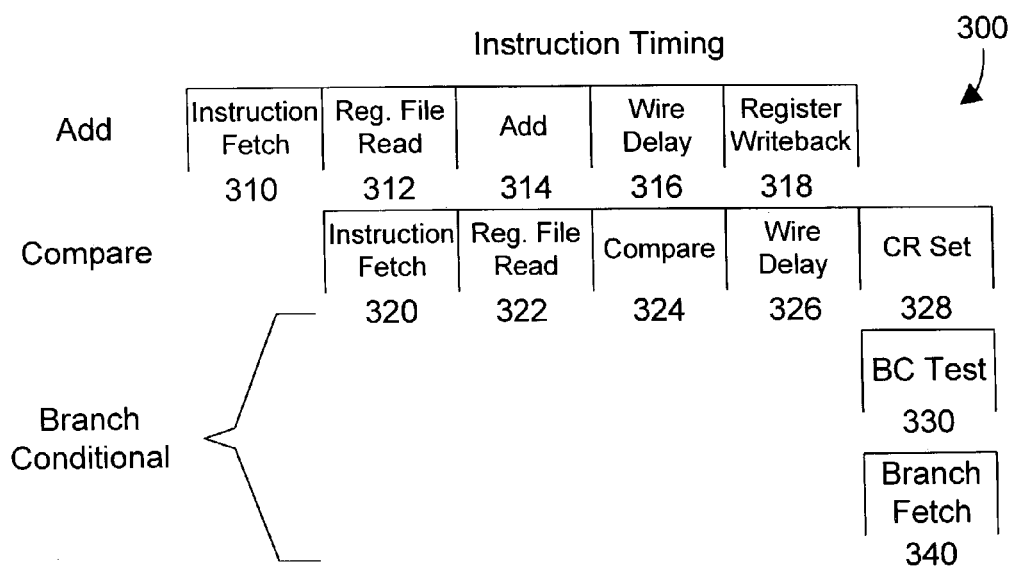
FIG. 3  Prior Art

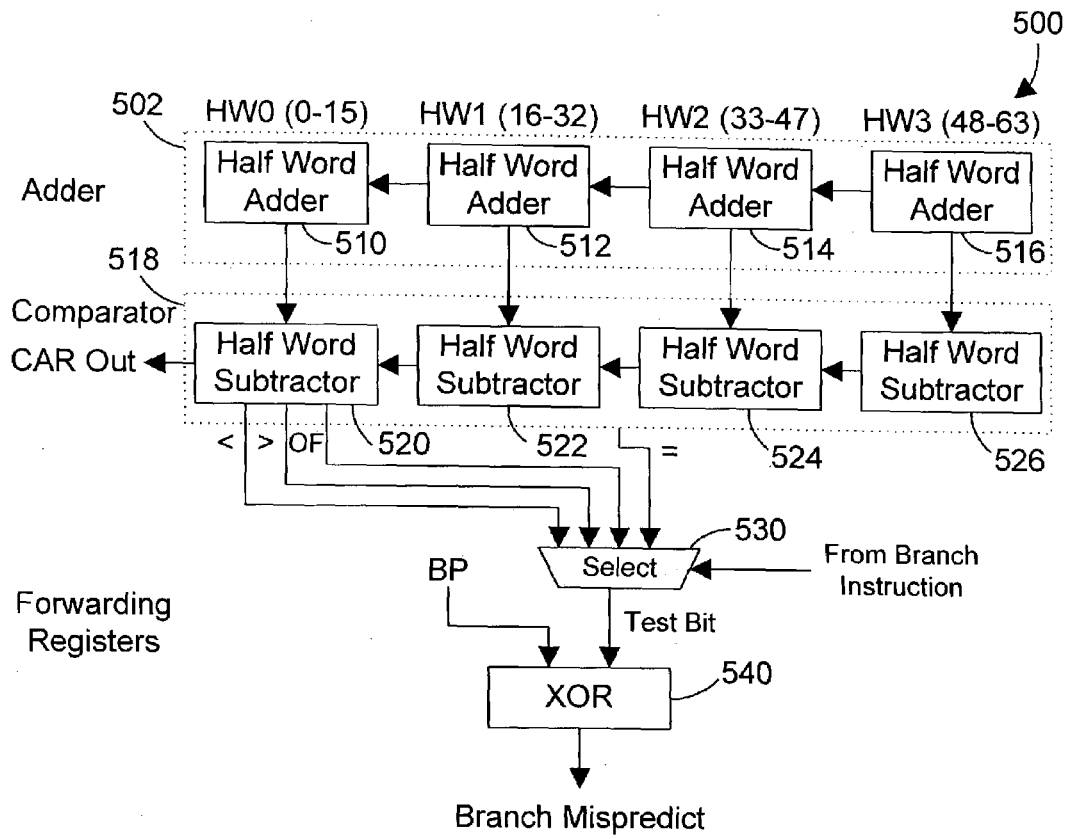
FIG. 5 _Prior Art_
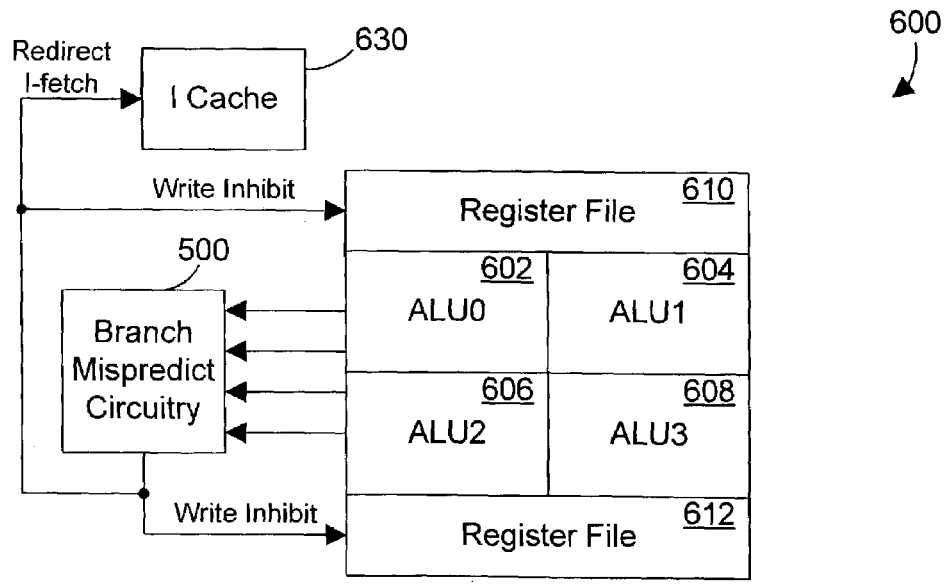
FIG. 6 _Prior Art_

HIGH FREQUENCY COMPOUND INSTRUCTION MECHANISM AND METHOD FOR A COMPARE OPERATION IN AN ARITHMETIC LOGIC UNIT

BACKGROUND OF THE INVENTION

1. Technical Field

This invention generally relates to data processing, and more specifically relates to execution of instructions in a computer system.

2. Background Art

Since the dawn of the computer age, computer systems have evolved into extremely sophisticated devices that may be found in many different settings. Computer systems typically include a combination of hardware (e.g., semiconductors, circuit boards, etc.) and software (e.g., computer programs). The performance of a computer program depends on the ability of the hardware to execute the computer program's instructions.

Some sequences of instructions are executed a relatively large number of times when executing a computer program. For example, a very common sequence of instructions in most computer programs is an add instruction followed by a compare instruction, followed by a branch that determines the program flow depending on the results of the compare instruction. One example of this add-compare-branch sequence is shown by the instructions in FIG. 1. In the prior art, the add operation typically must be completed before starting the compare operation, which in turn must be completed to determine which path the program flow will follow in the computer program when the branch instruction is executed.

In pipelined machines, an instruction pipeline typically attempts to enhance system performance by preloading and pre-executing instructions before they are actually encountered in the code. A conditional branch instruction presents a dilemma for an instruction pipeline. Most known instruction pipelines will pick one of the two possible paths, and will load the pipeline based on the assumed branch direction. If the assumed branch direction is incorrect, the instruction pipeline must invalidate the instructions in the mispredicted path and begin execution from the instruction in the correct branch direction.

When an instruction pipeline mispredicts the direction of a branch, performance penalties result from having to invalidate instructions in the pipeline in the mispredicted branch and execute the instructions in the correct branch path. These performance penalties may become significant. Without a way to improve branch misprediction, the prior art mechanisms and methods for executing instructions will continue to suffer from excessive delays when the direction of a branch is mispredicted by an instruction pipeline.

DISCLOSURE OF INVENTION

A high-frequency compound instruction mechanism and method allows performing a compare immediate function before an add function has completed, thereby reducing the number of cycles to perform ane add-compare function. By increasing the speed of performing the add-compare function, a branch mispredict signal may be provided to an instruction pipeline up to two cycles earlier to redirect pipeline execution before data registers are affected by the pipelined instructions in the mispredicted branch direction. The compound instruction mechanism of the preferred embodiments may be implemented within space that is primarily unused within arithmetic logic units, resulting in an implementation that only marginally increases space requirements on an integrated circuit.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 1 is a diagram of instructions in a computer program;

FIG. 2 is a timing diagram showing prior art execution of the instructions in FIG. 1;

FIG. 3 is a timing diagram showing the relationship between timing diagrams in the prior art for each of the three instructions shown in FIG. 1;

FIG. 5 is a block diagram showing how a branch mispredict signal is generated in the prior art for four half-words;

FIG. 6 is a block diagram used to illustrate floorplanning issues in the prior art;

BEST MODE FOR CARRYING OUT THE INVENTION

Figure 4:
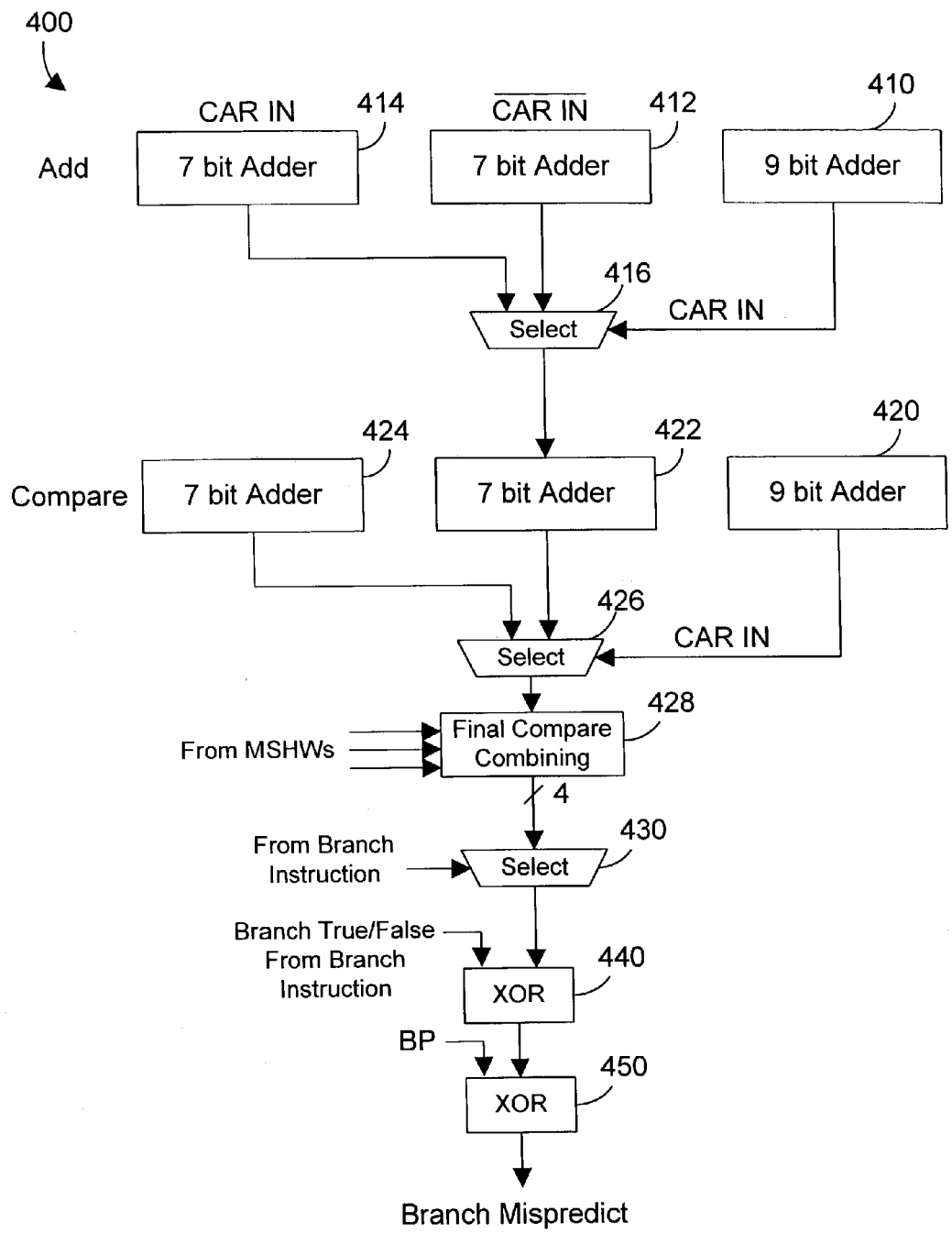
FIG. 4 is a block diagram showing how a branch mispredict signal is generated in the prior art for a single half-word.

A high frequency compound instruction mechanism in accordance with the preferred embodiments allows a compare immediate to commence before the add operation is complete. The result is an add/compare operation that is implemented in hardware that may be executed faster than separate add and compare operations.

Referring to FIG. 2, a timing diagram 200 illustrates the prior art execution of the instructions in FIG. 1. An add operation is typically performed in a single cycle 210. Once the add operation is complete, the compare operation may commence, and is typically executed in a single cycle 220. A cycle 230 is then allowed to pass to account for wire delay from the output of the comparator, to assure the results of the comparison are present and stable before the branch instruction is executed in cycle 240. The prior art mechanisms and methods thus execute the add/compare/branch instruction sequence of FIG. 1 in four cycles.

FIG. 3 shows an instruction timing diagram that illustrates the relationship and overlap that occurs when executing the add, compare and branch conditional instructions shown in FIG. 1. The Add instruction begins with an instruction fetch 310, followed by a register file read 312 to retrieve the add operands. Once the operands are retrieved from the register file in 312, the operands are added at 314. A cycle 316 of delay is inserted to account for wire delay, followed by a register writeback cycle 318. During the register writeback cycle 318, the results of the add are written to the appropriate data register(s).

The compare instruction begins with an instruction fetch at 320, followed by a register file read 322 to retrieve the operands for the compare operation. Next, the compare operation is performed at 324, followed by a cycle 326 for wire delay, and ending with a cycle 328 that sets the appropriate bit or bits in the condition register to indicate the results of the compare operation. The branch conditional test is performed by testing the appropriate bit(s) in the condition register at 330 by bypassing around the condition register, and the instruction fetch for the correct branch direction is performed at 340.

A prior art circuit 400 for generating a branch mispredict signal is shown in FIG. 4. We assume that an add operation is followed by a compare immediate operation to determine which branch to take. An add operation is performed by a 9 bit adder 410 that performs an addition operation on the lower nine bits of 16-bit operands. The upper seven bits of the 16-bit operands are added using two 7 bit adders 412 and 414. Adder 412 adds the seven bit operands assuming no carry in. Adder 414 adds the seven bit operands assuming a carry in. A multiplexer 416 uses the carry out of the 9 bit adder 410 to select which carry output of adders 412 and 414 is passed to 7 bit adder 422.

A compare operation is performed by a 9 bit adder 420 that performs an addition on the lower nine bits of 16-bit operands. The upper seven bits of the 16-bit operands are added using two 7 bit adders 422 and 424. Adder 422 adds the seven bit operands based on the carry in bit received from the output of multiplexer 416. Adder 424 adds the seven bit operands assuming a carry in. A multiplexer 426 uses the carry out of the 9 bit adder 420 to select which carry output of adders 422 and 424 is output. The output is combined with the results from the most significant half words by final compare combining 428. Final compare combining 428 determines whether the most significant half words are all zeroes or ones, and if so, generates an appropriate output. The output preferably indicates four logical conditions that correspond to equals, less than, greater than, and overflow. One of these four conditions is selected by multiplexer 430 using two bits from the branch instruction. The resulting output is then compared by the branch true/false indication from the branch instruction using XOR gate 440. The output of XOR gate 440 is then compared to the predicted branch direction BP using XOR gate 450. The output of XOR gate 450 is a branch mispredict signal. In this particular case, a high level on Branch Mispredict indicates that the direction of the predicted branch is incorrect (i.e., a branch misprediction), while a low level on Branch Mispredict indicates that the direction of the predicted branch is correct (i.e., a correct branch prediction).

FIG. 5 shows a block diagram of a prior art circuit 500 for generating a branch mispredict signal. A double word adder 502, comprised of four half-word adders 510, 512, 514 and 516, performs the addition operation. The carry out from each half word adder is input into a half word subtractor, four of which 520, 522, 524, and 526 perform the function of a double word comparator 518. The conditions of greater than, less than, and overflow (OF) are generated by half word subtractor 520, while the condition of equals is generated by the three most significant half word subtractors 520, 522 and 524. The branch instruction includes two bits that specify which condition to branch on, and the appropriate bit corresponding to that condition is driven to the test bit output of a multiplexer 530. The output of the multiplexer 530 is exclusive-ORed (540) with a bit BP indicating the direction of the predicted branch, the result of which is the branch mispredict signal.

FIG. 6 shows a prior art high-level floorplan for an integrated circuit showing one known layout. Four arithmetic logic units (ALUs) 602, 604, 606 and 608 are clustered together, with two register files 610 and 612 on either side. In the prior art, the branch mispredict circuitry 500 shown in FIG. 5 is implemented external to the ALUs and register files. The location of the branch mispredict circuitry 500 outside of the ALUs and register files typically requires a full bus cycle of wire delay, as shown in cycles 316 and 326 of FIG. 3. A "write inhibit" signal is generated from the branch mispredict signal at the output of the exclusive OR gate 540, which prevents the writing of values to register files 610 and 612 by an instruction in a mispredicted path of execution. The branch mispredict signal may also be used to redirect the instruction cache 630 to the correct branch of execution. When the branch mispredict signal is asserted, the instruction cache 630 invalidates the instructions in the mispredicted branch direction and begins filling the instruction cache from the new branch direction indicated by the branch mispredict signal.

One problem evident in the prior art as shown in FIGS. 2–6 is that an add operation must be completed before beginning a compare operation. The preferred embodiments provide a hardware comparator that can use the carry out results of low-order addition operations to begin a compare operation and complete it before the entire addition operation is complete. Another significant advantage of the preferred embodiments is the ability to use space on an integrated circuit within the ALU core to implement the branch mispredict logic, resulting in faster execution times and less usage of usable real estate on an integrated circuit.

Figure 7:
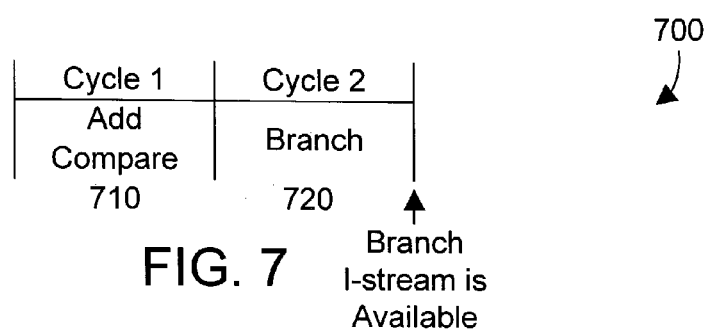
FIG. 7 is a timing diagram showing a reduced number of cycles for the instruction mechanism of the preferred embodiments.

Referring now to FIG. 7, a timing diagram 700 shows the execution of the add/compare/branch sequence of instructions in FIG. 1 in accordance with the preferred embodiments. The high frequency compound instruction mechanism and method of the preferred embodiments allow an addition and compare operation to be performed in the same cycle 710. The following cycle 720 is for the execution of the branch instruction. At the end of cycle 720, the instruction stream for the correct direction of branch is available for execution. When compared to timing diagram 200 in FIG. 2, we see that the same add/compare/branch instruction stream in FIG. 1 may be executed in two cycles compared to the four cycles shown in FIG. 2. The result is a significant improvement in performance when processing an add/compare/branch sequence of instructions.

Figure 8:
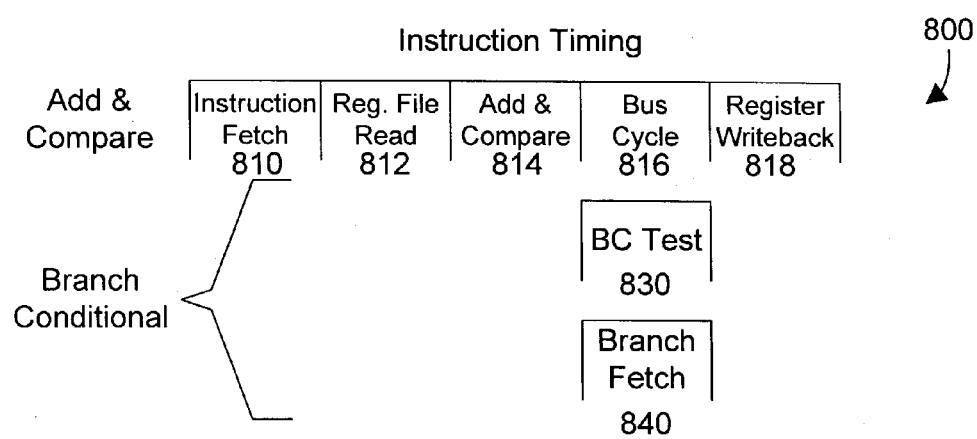
FIG. 8 is an instruction timing diagram that graphically illustrates how the instruction mechanism of the preferred embodiments performs an add, compare and branch in fewer cycles than known prior art instruction mechanisms.

An instruction timing diagram 800 is shown in FIG. 8 to show the operations performed in executing the add and compare operation and in performing the branch conditional operation. The add&compare operation begin with an instruction fetch 810. Next, the operands for the add&compare operation are read from the register file at 812. The add&compare function is then executed at 814. Note that the branch mispredict output from the comparator is available at the end of the cycle 814 that performs the add&compare operation, so the very next cycle the branch condition test 830 and branch fetch 840 for the correct branch of execution may be performed. Note that a cycle of delay 816 is typically inserted to allow all signals to propagate before performing a register writeback at cycle 818. The differences between the instruction timing in FIG. 3 and FIG. 8 illustrate a significant advantage of the present invention. In the prior art instruction timing shown in FIG. 3, the register writeback 318 occurs before the branch condition can be tested at 330. This means that it is possible to corrupt data registers with data from instructions that will not be executed. In the preferred embodiments, in contrast, the branch conditional test is performed at 830 BEFORE the register writeback at 818. As a result, the branch mispredict output may be used to inhibit the register writeback, thus preserving the data intact. The preferred embodiments not only provide faster execution, but they eliminate the possibility of corrupting data in the register file from instructions that are not in the correct path of execution.

Figure 9:
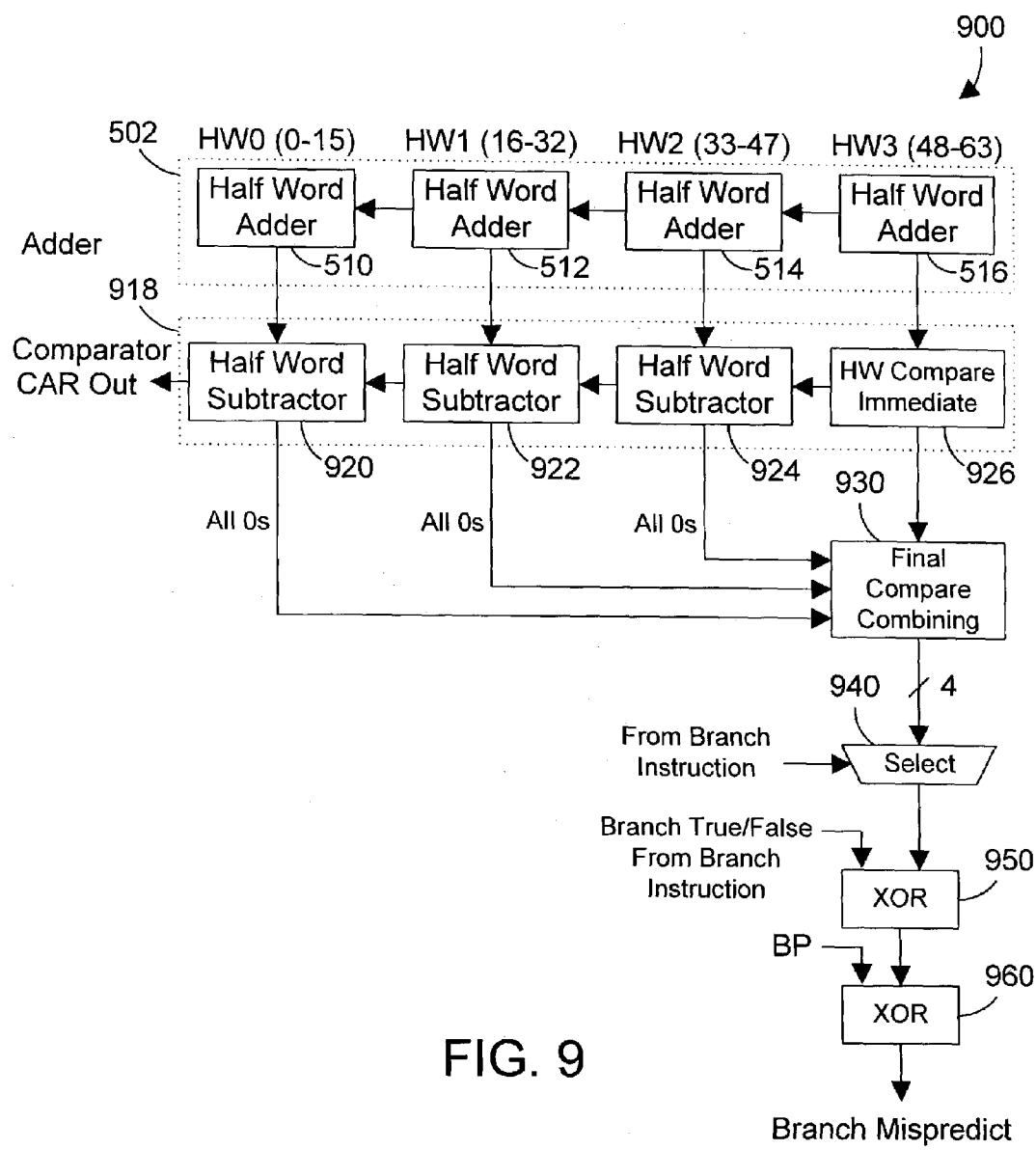
FIG. 9 is a block diagram of the compound instruction mechanism of the preferred embodiments.

Referring to FIG. 9, a branch mispredict circuit 900 in accordance with the preferred embodiments performs a hardware implementation for a very fast add/compare immediate half word operation. Circuit 900 includes a double word adder 502 that is preferably similar to adder 502 in FIG. 5. The carry outputs of the half word adders 510, 512, and 514 are output to respective half word subtractors 920, 922, and 924, which are part of comparator 918. Because comparator 918 only implements a compare immediate half word operation, the half word subtractors 920, 922 and 924 for the three most significant half words only need to determine if all of their bits are ones or zeroes. The output of comparator 918 for these three upper half words may thus be one or four logic states, namely: all 1s, all 0s, not all 1s, and not all 0s, which may be represented by the four different logic states of two logic lines. Note that FIG. 9 assumes all zeros are checked in the upper three half words 920, 922 and 924, which assumes the double word operand is a positive number. If the double word operand were instead a negative number, the upper three half words 920, 922 and 924 would check for all ones instead of all zeros.

The half word compare immediate function is implemented in the least significant half word HW3 by a hardware compare immediate circuit 926. A circuit 930 then performs final compare combining to generate four logic signals, one for each of the following states: less than, greater than, equals, and overflow. These are the four outputs from final compare combining 930 to multiplexer 940. Two bits of the branch instruction determine which of these four conditions is driven by multiplexer 940 to its output. This output bit is then compared using an exclusive or gate 950 with a branch true/false condition from the branch instruction. The resulting output is the compared with a bit BP that indicates the predicted direction of the branch using XOR gate 960 to generate a branch misprediction signal at its output. Note that the compare function may commence as soon as the carry output for the half word adder 516 in HW3 is available, which is typically long before the high order half word adder 502 completes the addition operation. In addition, the three high-order half words for the compare operation only have to determine whether or not all bits are zero or one (via a 16-way NAND), greatly simplifying their implementation and speeding the resulting output without waiting for the subtractor result. As a result, the branch mispredict circuit 900 generates a branch mispredict signal in time to inhibit a writeback to the register file, as shown 830 and 818 of FIG. 8.

Figure 10:
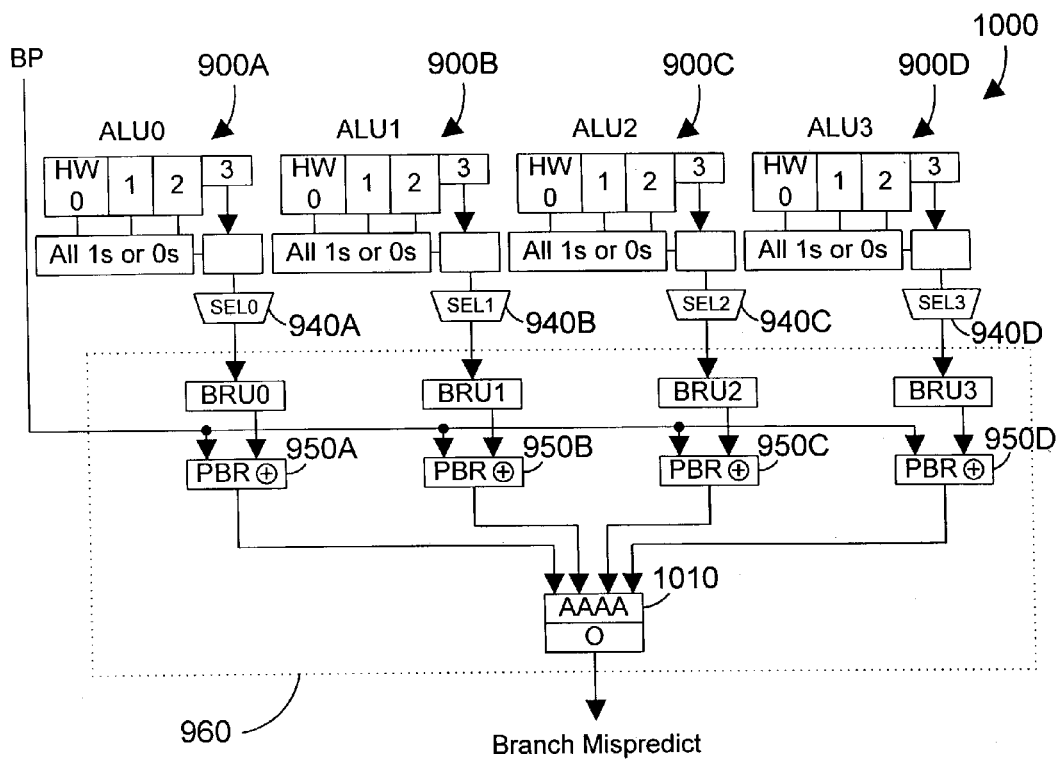
FIG. 10 is a more detailed block diagram of the compound instruction mechanism of the preferred embodiments.

One suitable implementation of an integrated circuit in accordance with the preferred embodiments includes the high frequency compound instruction mechanism 900 of FIG. 9 implemented within four ALUs, shown in circuit 1000 of FIG. 10. The high-frequency compound instruction mechanism in each ALU preferably includes the circuit 900 shown in FIG. 9, which is shown in simplified form in FIG. 10 as 900A, 900B, 900C and 900D to show how four ALUs may all include this high frequency compound instruction mechanism. Multiplexers 940A, 940B, 940C and 940D are representative of the multiplexer 940 in FIG. 9, while gates 950A, 950B, 950C and 950D are representative of the XOR gate 950 in FIG. 9. Because four ALUs are present, an additional AND-OR gate 1010 is required to logically AND-OR the branch mispredict signals for each ALU to generate a branch mispredict signal for all ALUs.

Figure 11:
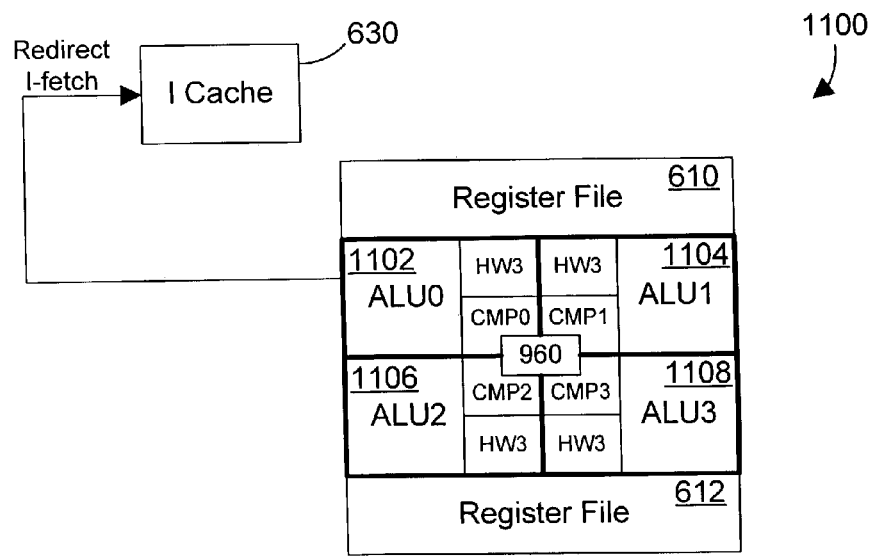
FIG. 11 is a block diagram showing advantages in floorplanning attributed to the compound instruction mechanism of the preferred embodiments.

FIG. 11 shows a high-level floorplan of an integrated circuit that implements circuit 1000 of FIG. 10 in accordance with the preferred embodiments. ALUs 1102, 1104, 1106 and 108 each implement their adder for half word three HW3 near the inner core, next to their respective comparators CMP0, CMP1, CMP2 and CMP3.

Because each comparator CMP0, CMP1, CMP2 and CMP3 only produces a four bit condition code output result rather than a 64-bit ALU result, a much more robust and faster wire choice can be made, where a conductor 4× wide, 4× thick and 4× spaced from its neighbors can be used, thereby reducing wire/bus delay by approximately two thirds. In addition, because the branch test unit logic is so small, it may be replicated, one for each comparator. Thus, no forwarding of comparator/branch test results is required, but only that the four branch test outputs are AND-ORed together at the very center of the inner core. Note that the circuitry in box 960 in FIG. 10 is preferably implemented at the very center of the ALU inner core, as shown in FIG. 11. As a result, no forwarding delay is required for the output of each comparator because they all reside at the very center of the ALU inner core area. Thus, they are physically adjacent so that their outputs can be compared to the predicted branch bit and ORed together to indicate a branch mispredict event which can stop or kill execution of instructions in the instruction cache 630 as required, and can inhibit writing to register files 610 and 612. Thus, the combined fact that only four comparator outputs are needed using very fast wires and the fact that these wires are quite short (compared to ALU result forwarding buses) ensures that the total delay for a compound add/compare/test cycle is less than a 64-bit add plus forward cycle. As a result, we can always perform the add/compare/test function and redirect execution several cycles before writeback to the register file is attempted, thereby substantially improving branch mispredict performance and easily preventing corruption of the register file by instructions that are in a mispredicted path.

Figure 12:
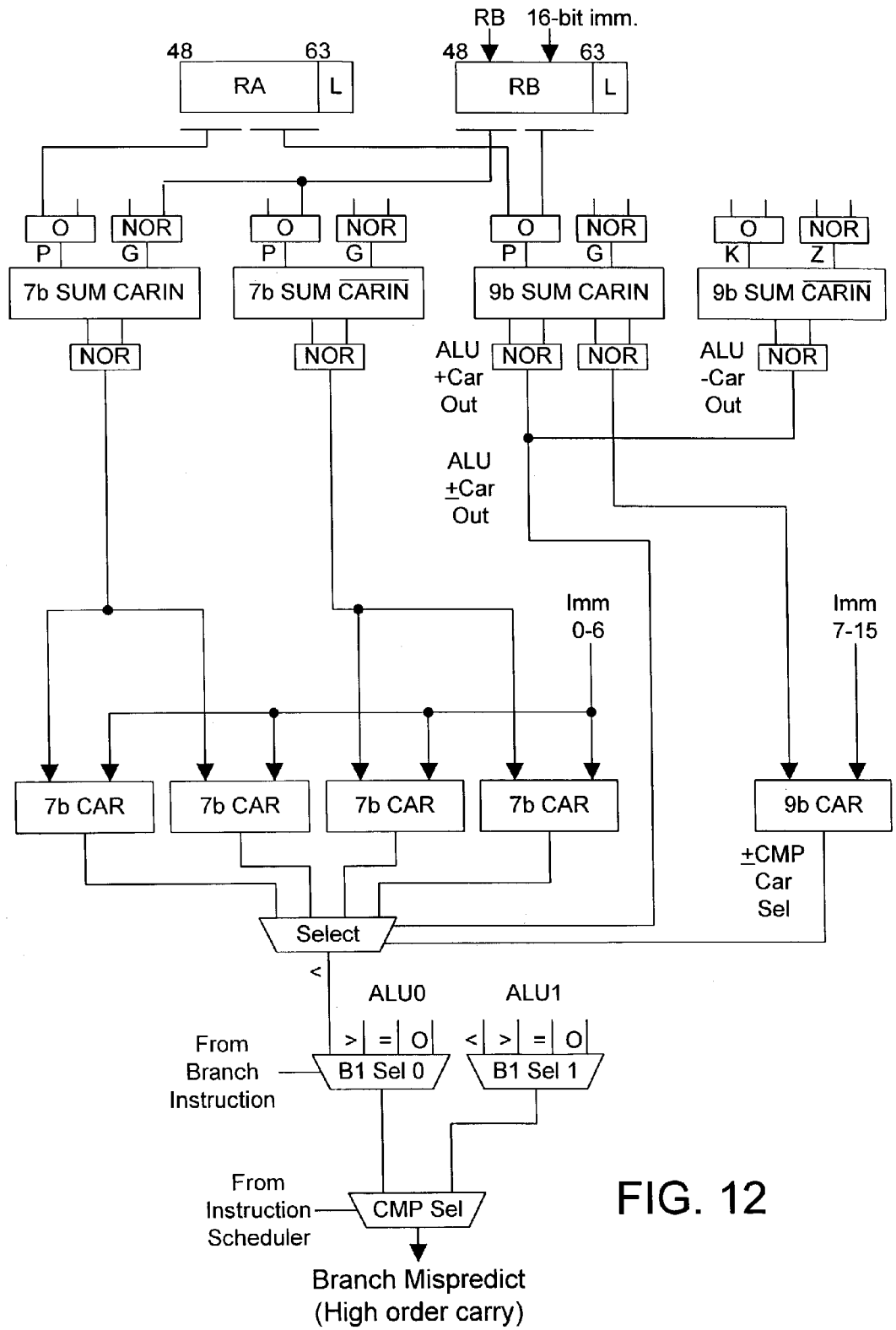
FIG. 12 is a detailed block diagram showing implementation of the compound instruction mechanism in accordance with the preferred embodiments.

A detailed implementation of the high frequency compound instruction mechanism of the preferred embodiments is shown in FIG. 12. In FIG. 12, a preferred implementation for the HW3 16-bit adder/comparator is shown where the adder implements a two-way carry select sum scheme and the comparator further implements its own two-way carry select carry generation scheme before knowing the adder output carries such that a four way compound carry select is implemented by actually implementing four unique copies of the high order 7 bit comparator carry tree and then using the low order carry/no carry adder outputs (2 signal lines) and the low order carry/no carry comparator outputs (2 signal lines) for a total of four signal lines to control the final four-way select of the four generated carry possibilities.

Figure 13:
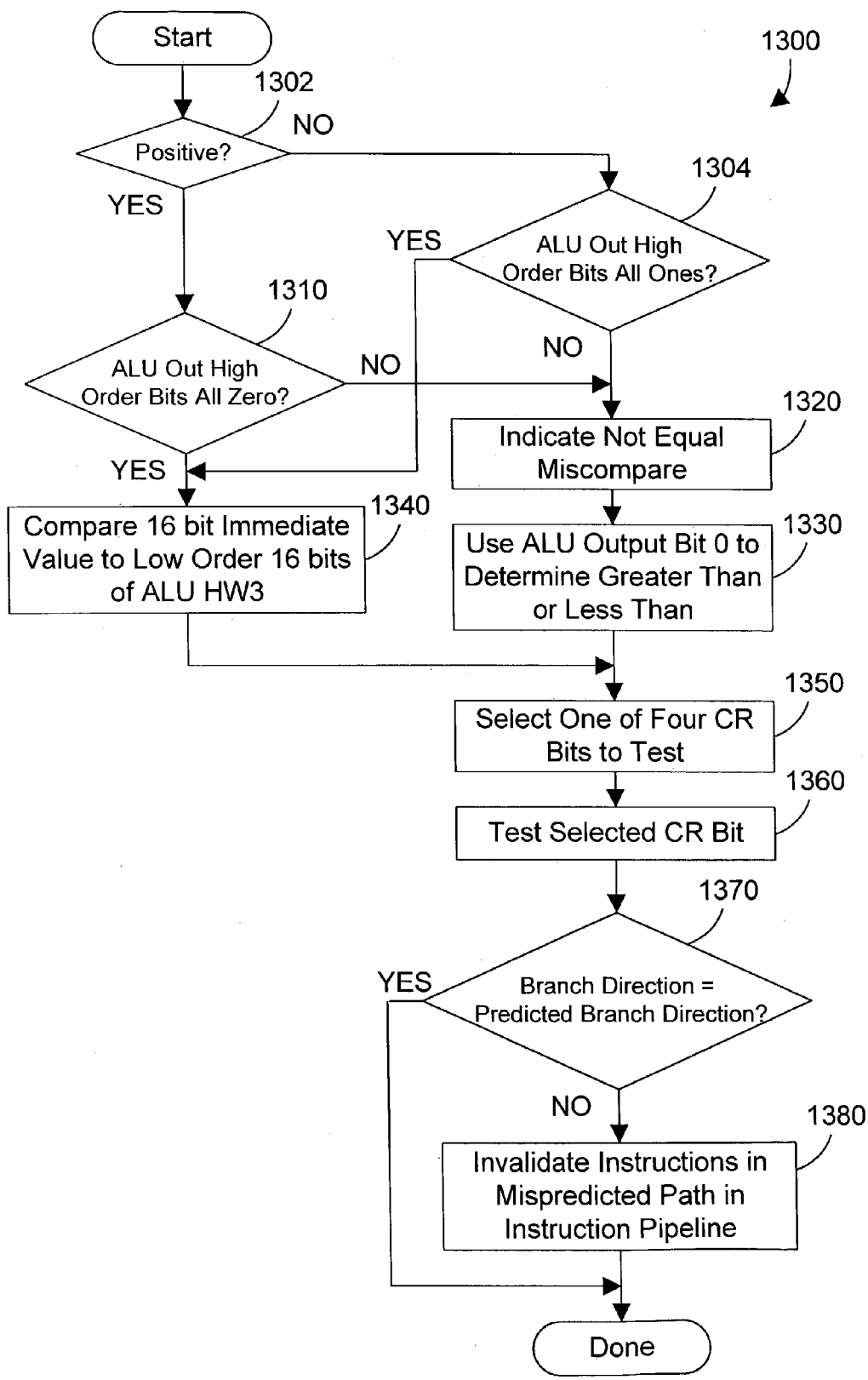
FIG. 13 is a flow diagram of a method in accordance with the preferred embodiments.

Referring to FIG. 13, a method 1300 in accordance with the preferred embodiments represents functions preferably performed by the high frequency instruction mechanism. First, the double word operand is checked to see if it is positive or negative (step 1302). If the double word operand is positive (step 1302=YES), the high order bits are tested to see if they are all zero (step 1310). If so (step 1310=YES), the 16 bit immediate value is compared to the low order 16 bits of ALU HW3 (step 1340). If not (step 1310=NO), a not equal miscompare is indicated (step 1320), and the ALU output bit 0 is used to determine whether the result is greater than or less than (step 1330). At this point step 1350 is performed to select one of the four condition register bits to test. This bit is then tested (step 1360). If the branch direction is the same as the predicted branch direction (step 1370=YES), no action with respect to the pipeline need be taken because the predicted branch direction was correct. If, however, the branch direction is not the same as the predicted branch direction (step 1370=NO), the instructions in the mispredicted path in the instruction pipeline are invalidated (step 1380) to prevent the instructions in the mispredicted path from affecting register values.

If the double word operand is negative (step 1302=NO), the high order bits are tested to see if they are all ones (step 1304). If the high order bits are all ones (step 1304=YES), step 1340 is performed. If the high order bits are not all ones (step 1304=NO), step 1320 is performed. At this point, method 1300 proceeds as described above.

The specific examples discussed above relate to an add-compare-branch instruction sequence. Note, however, that the preferred embodiments expressly extend to any function of an Arithmetic Logic Unit (ALU) that is followed by a compare and branch. Thus, instead of an add-compare-branch, the preferred embodiments could also extend to an exclusive OR-compare-branch instruction sequence. The preferred embodiments expressly extend to performing any arithmetic or logic function on operands of a first length, where a comparator performs a compare immediate operation between an immediate operand of a second length that is shorter than the first length and a least significant portion of the ALU result.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. An integrated circuit comprising:
   an arithmetic logic unit (ALU) that performs an operation on two operands of a first length to produce a result of the first length; and
   a comparator that performs a compare immediate operation between an immediate operand of a second length that is shorter than the first length and a least significant portion of the result from the ALU, wherein the comparator begins the compare immediate operation before the ALU produces the result of the first length.

2. The integrated circuit of claim 1 wherein the operation comprises an arithmetic operation.

3. The integrated circuit of claim 1 wherein the operation comprises a logic operation.

4. The integrated circuit of claim 1 wherein the output of the comparator is used to generate a branch mispredict logic signal that indicates a branch misprediction in a first logic state and that indicates a correct branch prediction in a second logic state.

5. The integrated circuit of claim 4 wherein the branch mispredict logic signal is generated before the result of the first length is generated.

6. The integrated circuit of claim 4 wherein the branch mispredict logic signal is generated before data registers are affected by instructions in an instruction pipeline that are in a mispredicted path of execution.

7. The integrated circuit of claim 1 further comprising an instruction pipeline that contains instructions in a mispredicted path of execution that are invalidated when the branch mispredict logic signal indicates a branch misprediction.

8. The integrated circuit of claim 7 wherein, after the instructions in the mispredicted path of execution are invalidated, the instruction pipeline begins loading from a correct instruction path of execution when the branch mispredict logic signal indicates a branch misprediction.

9. The integrated circuit of claim 1 wherein the ALU and comparator are implemented within space that is primarily unused within at least one other ALU.

10. An integrated circuit comprising:
    an adder that performs an addition operation on two operands of a first length to produce a sum of the first length;
    a comparator that performs a compare immediate operation between an immediate operand of a second length that is shorter than the first length and a least significant portion of the sum from the adder, wherein the comparator begins the compare immediate operation before the adder produces the sum of the first length, wherein the output of the comparator is used to generate a branch mispredict logic signal that indicates a branch misprediction in a first logic state and that indicates a correct branch prediction in a second logic state; and
    an instruction pipeline that contains instructions in a mispredicted path of execution that are invalidated when the branch mispredict logic signal indicates a branch misprediction.

11. The integrated circuit of claim 10 wherein the branch mispredict logic signal is generated before the sum of the first length is generated.

12. The integrated circuit of claim 10 wherein the branch mispredict logic signal is generated before data registers are affected by instructions in the instruction pipeline that are in a mispredicted path of execution.

13. The integrated circuit of claim 10 wherein the adder and comparator are implemented within space that is primarily unused within at least one arithmetic logic unit.

14. The integrated circuit of claim 10 wherein, after the instructions in the mispredicted path of execution are invalidated when the branch mispredict logic signal indicates a branch misprediction, the instruction pipeline begins loading from a correct instruction path.

15. A method for performing a compound ALU-compare function in an integrated circuit, the method comprising the steps of:
    (A) beginning an ALU operation on two operands of a first length to produce a result of the first length;
    (B) before the ALU operation produces the result of the first length, performing a compare operation between an immediate operand of a second length that is shorter than the first length and a least significant portion of the result from the ALU operation;
    (C) using the result of the compare operation to generate a branch mispredict logic signal that indicates a branch misprediction in a first logic state and that indicates a correct branch prediction in a second logic state; and
    (D) using the branch mispredict logic signal to determine a path of execution in an instruction pipeline.

16. The method of claim 15 wherein the ALU operation comprises an arithmetic operation.

17. The method of claim 15 wherein the ALU operation comprises a logic operation.

18. The method of claim 15 further comprising the step of generating the branch mispredict logic signal before the result of the first length is generated.

19. The method of claim 15 further comprising the step of generating the branch mispredict logic signal before data registers are affected by instructions in an instruction pipeline that are in a mispredicted path of execution.

20. The method of claim 15 further comprising the step of invalidating instructions in a mispredicted path of execution in the instruction pipeline when the branch mispredict logic signal indicates a branch misprediction.

21. The method of claim 20 further comprising the step of loading the instruction pipeline from a correct instruction path after invalidating the instructions in the mispredicted path of execution in the instruction pipeline.

22. A method for detecting a branch misprediction before data registers are affected by instructions in an instruction pipeline that are in a mispredicted path of execution, the method comprising the steps of:

(A) beginning an addition operation on two operands of a first length to produce a sum of the first length; and (B) before the addition operation produces the sum of the first length, performing a compare operation between an immediate operand of a second length that is shorter than the first length and a least significant portion of the sum from the addition operation;

(C) generating from the result of the compare operation a branch mispredict logic signal that indicates a branch misprediction in a first logic state and that indicates a correct branch prediction in a second logic state; and (D) using the branch mispredict logic signal to invalidate instructions in a mispredicted path of execution in an instruction pipeline when the branch mispredict logic signal indicates a branch misprediction.

23. The method of claim 22 further comprising the step of loading the instruction pipeline from a correct instruction path after invalidating the instructions in the mispredicted path in the instruction pipeline.

* * * * *